Nov. 15, 1955  C. E. EISENHART  2,723,791
APPARATUS FOR ATTACHING CLOSURE CAPS TO CUPS
Filed Sept. 18, 1952  3 Sheets-Sheet 1

INVENTOR.
CLAIR E. EISENHART
BY
ATTORNEY

Nov. 15, 1955   C. E. EISENHART   2,723,791
APPARATUS FOR ATTACHING CLOSURE CAPS TO CUPS
Filed Sept. 18, 1952   3 Sheets-Sheet 2
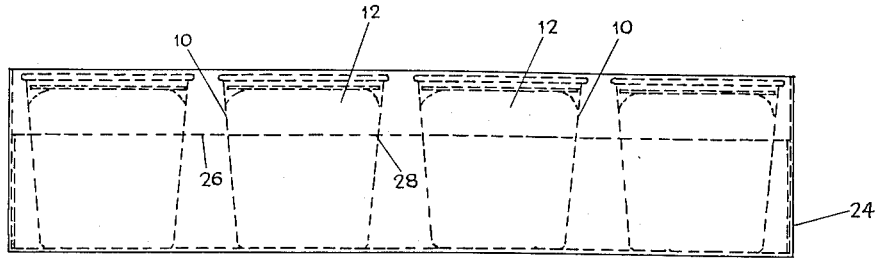
FIGURE 11
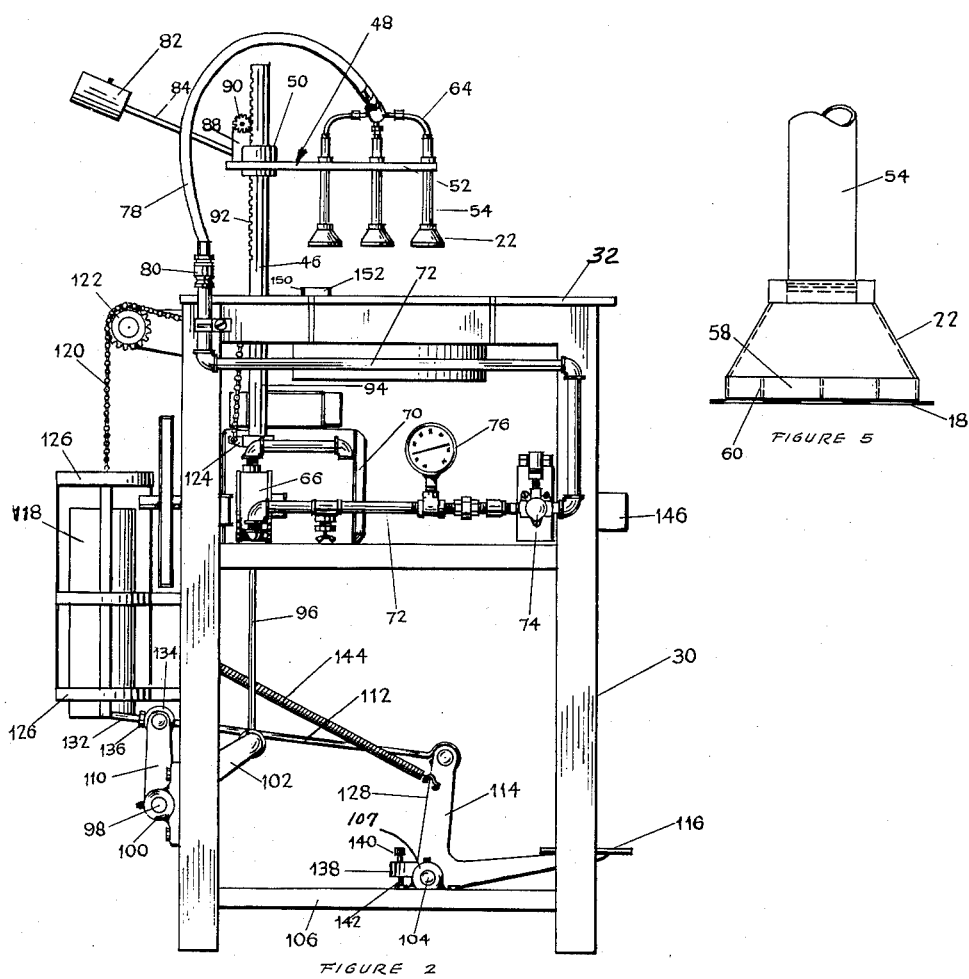
FIGURE 2
FIGURE 5
INVENTOR.
CLAIR E. EISENHART
BY
ATTORNEY Nov. 15, 1955  C. E. EISENHART  2,723,791
APPARATUS FOR ATTACHING CLOSURE CAPS TO CUPS
Filed Sept. 18, 1952  3 Sheets-Sheet 3
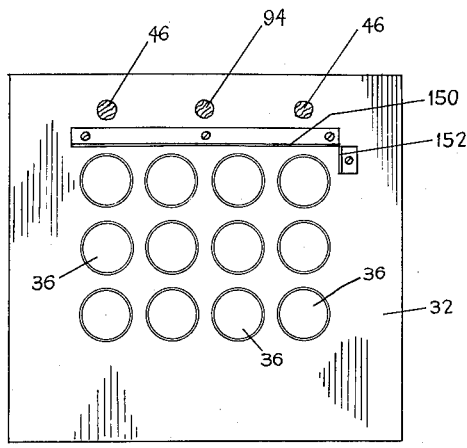
FIGURE 4
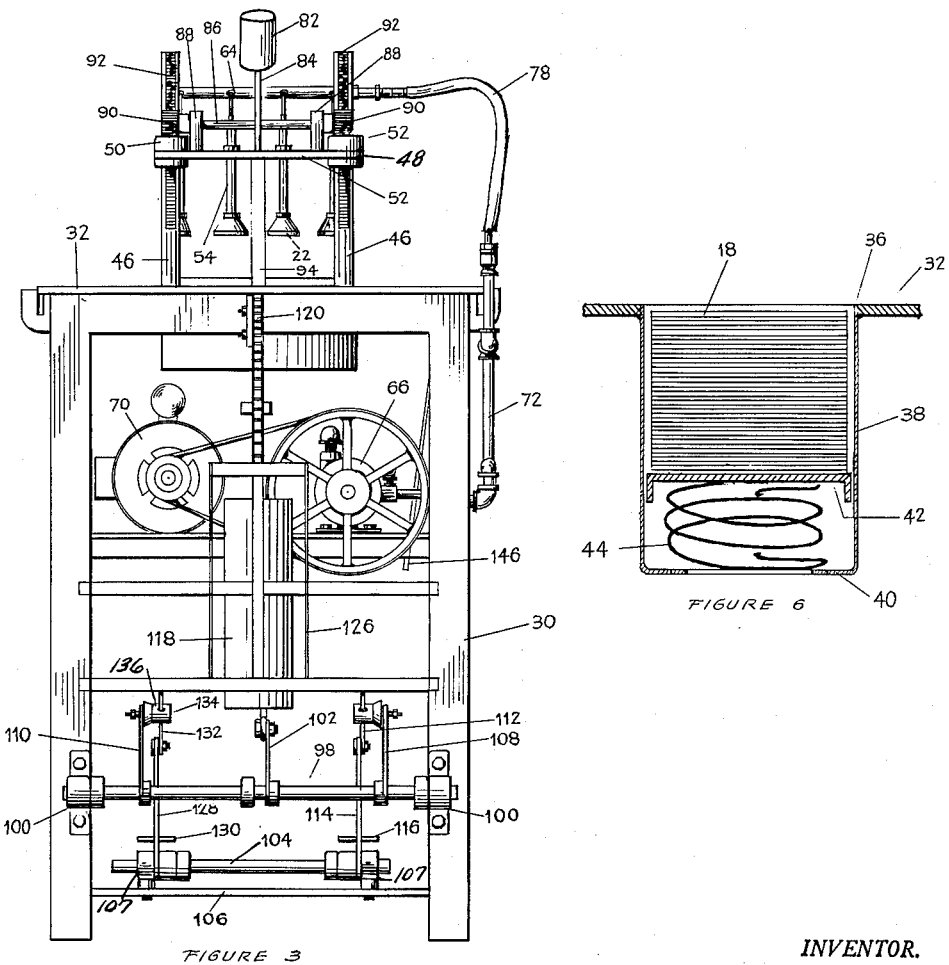
FIGURE 3
FIGURE 6
INVENTOR.
CLAIR E. EISENHART
BY
ATTORNEY

United States Patent Office 2,723,791
Patented Nov. 15, 1955

2,723,791

APPARATUS FOR ATTACHING CLOSURE CAPS TO CUPS

Clair E. Eisenhart, York, Pa., assignor to Eisenhart Dairy, Inc., York, Pa., a corporation of Pennsylvania Application September 18, 1952, Serial No. 310,346

9 Claims. (Cl. 226—81)

This invention relates to a confection product, and a process and apparatus for forming the same. More particularly, the invention relates to a sanitary confection product packaged within a collapsible container so as to prevent contamination of the confection contents thereof; a process by which said confection is packaged so as to render the same sanitary; and an apparatus by which the confection is packaged and particularly capped so as to enclose the confection within a capped type container of such nature as to prevent the contents from readily being contaminated while being stored awaiting sale as well as being consumed by the purchaser.

Still further, the invention relates especially, but without restriction thereto, to a frozen dairy type confection enclosed in a collapsible cup formed from folded or otherwise shaped paper which is preferably moisture proof or moisture resistant. Upon being held in a human hand, heat therefrom will warm the frozen contents sufficiently that when said container, which is of a collapsible nature, is gradually squeezed from the bottom upward, the container may readily be collapsed and progressively expel the confection therewithin from the upper end of the container where the same may be eaten without appreciable dripping or leaking from the container. The collapsing of the cup-like container may be continued until the confection therein is entirely consumed. By using a collapsible cup-like enclosure for a frozen confection of the dairy type, such as water ice or ice cream, for example, and upon squeezing said container as described above to discharge the frozen contents from the cup, a container and dispensing method are provided which do not require the use of a napkin in order to consume the product without unsightly and messy dripping and the like.

Filling a collapsible cup-like container with confection and particularly with a frozen confection presents a problem as to rendering the tops of the filled containers sanitary, especially while being stored and awaiting sale to the ultimate consumer.

Certain methods have been used previously, such as placing a number of filled containers within a box and placing a cover over the entire box. Another has been to cover a plurality of filled cups with a temporary type of closure such as a sheet of paper placed over all of the cups or over individual cups of said confection. Some municipalities have required that confection products of this type be more effectively covered or capped in order to insure sanitary conditions for the product to a far higher degree than the aforementioned have provided and this has rendered said previous methods obsolete.

In filling a collapsible cup and particularly one formed from folded paper with a frozen or other type of confection, a far different problem is presented from that involved in filling and capping, for example, conventional ice cream or sherbert cups or cupped shaped containers formed from chipboard or pasteboard of relatively rugged and stiff nature. In the latter type of cup an annular shoulder or recess usually is formed adjacent the upper end of the cup and a rigid cap formed from material similar to the cup is forced or snapped into said recess or shoulder by firm pressure from a suitable plunger. Obviously, a cup made from paper so as to be readily collapsible by pressure from a single human hand applied against the sides and bottom thereof can not have a cap applied thereto by such means as just described. Thus, capping a collapsible type cup-like container substantially filled with a frozen confection presents serious problems but these problems have been solved by the present invention which utilizes a novel construction and method for attaching a cap to a confection filled collapsible container, as well as a novel capping apparatus for applying caps to said confection filled collapsible containers.

It is an object of the present invention to provide a sanitary confection enclosed in a collapsible type container which may be progressively squeezed laterally adjacent the bottom and gradually upward to expel the contents thereof, said container being capped to cover the contents therein and said cap being slightly smaller in diameter than the inner diameter of the upper portion of the container, said cap being held in operative position by adherence to the confection within the container.

It is another object of the invention to provide a process by which a fragile and collapsible cup-like container is filled with a confection dispensed from a filling machine in a peak-like configuration within the container and a cap of slightly smaller diameter than the inner diameter of the upper portion of the container is applied against said peak-like configuration of confection to flatten the same within the container and cause firm adherence between the confection and the said cap so as to hold said cap in closure forming relationship with said cup-like container.

It is still another object of the invention to provide a capping apparatus or machine for attaching or applying caps to fragile collapsible cup-like containers filled or substantially filled with confection and particularly with a semi-frozen confection, said caps and capping machine being so arranged and constructed that the fragile cup-like containers sustain no injury while the caps are being applied to the contents.

A still further object of the invention is to provide a capping machine of the type described with simple and novelly arranged cap holding means from which caps may successfully be removed and applied to containers as fed to the capping machine.

Ancillary to the foregoing object, it is an additional object to provide a table arrangement having one or more apertures therein and a well-like reservoir depending from each aperture for purposes of holding a stack of caps thereon, a suction head also being movable into each reservoir to engage and withdraw by suction the uppermost cap in said reservoir and then to move the same to a position above said table and from which the cap may be applied to a confection filled cup when moved beneath said head.

A still further object related to the foregoing objects is to provide a plurality of cap containing reservoirs arranged in said table in a predetermined pattern and also to provide a similarly arranged plurality of suction heads movable as described above for purposes of capping in unison a plurality of confection filled cups or cup-like containers.

Additional objects of the invention are to provide in the aforementioned capping apparatus refinements of construction by which the capping head may be moved toward and away from capping position with a minimum of effort or canting of the head relative to its guiding means; novel operating or manipulation mechanism also being provided where it is desired to have the capping apparatus manually operated, including manipulation by the feet or legs of an operator.

Details of the foregoing objects and the invention, as well as other objects thereof are set forth in the following specification and illustrated in the accompanying drawings forming a part thereof.

In the drawings:

Fig. 2 is a side elevation of the apparatus shown in Fig. 1.

Fig. 3 is a rear elevation of the capping apparatus shown in Fig. 1 and Fig. 2.

Fig. 4 is a top plan view of the table surface of the capping apparatus illustrated in Figs. 1 through 3.

Fig. 5 is a fragmentary, enlarged side elevation of a suction head embodied in the capping apparatus.

Fig. 6 is a fragmentary enlarged vertical sectional elevation of a cap containing reservoir depending from the table of the capping apparatus.

Figure 7:
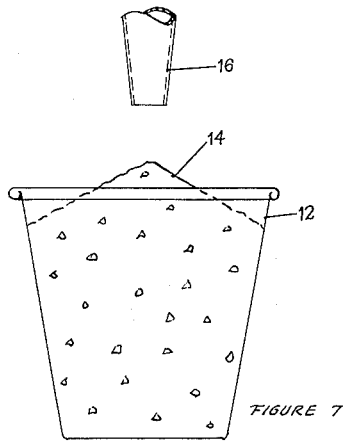
Figure 8:
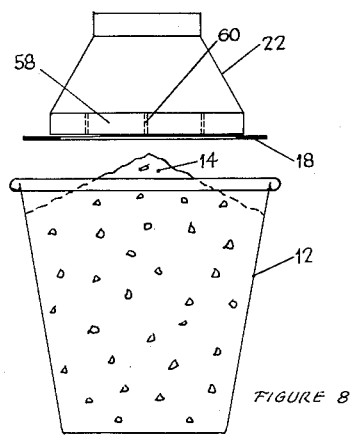
Figure 9:
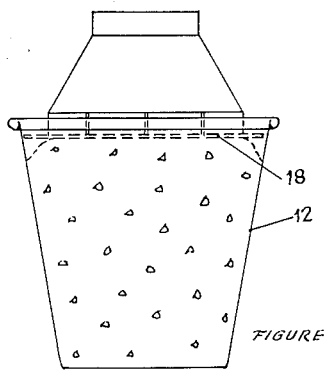

Figs. 7, 8 and 9 respectively are: enlarged side elevations of a collapsible container being filled with a confection; said filled container having a cap in position to be applied thereto; and a filled container to which the cap has been applied.

Figure 10:
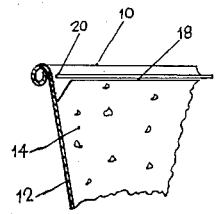

Fig. 10 is a fragmentary enlarged sectional view showing the position of the cap in a capped confection filled container in accordance with the present invention.

Fig. 11 is a side elevation of a box for holding a plurality of capped confection filled containers, one side of said box being partly broken so as better to illustrate the contents thereof.

Referring to the drawings, the present invention comprises a sanitary confection product 10 consisting of a collapsible cup or cup-like container 12, which is preferably frusto-conical in shape and, also in the preferred embodiment of the invention, is formed from relatively thin water resistant paper folded or otherwise shaped into a cup-like configuration having a somewhat rounded rim or upper edge. Collapsible cups of this nature are in wide use and are dispensed from containers extensively used in both public places and private homes. They are easily collapsed or crushed by a slight hand squeeze. The collapsible cup, when filled or substantially filled with a confection 14 may be squeezed or compressed laterally adjacent the bottom of the cup and gradually upward so as progressively to force the confection upward from the top of the cup 12, where the same may readily be eaten by the ultimate consumer.

While in the preferred embodiment of the invention it is contemplated that the confection shall be of a frozen dairy type such as ice cream, water ice or sherbert, or the like, it will be understood that other types, for example, of relatively soft candy like confections and the like may be contained within the cup 12.

The product comprising the present invention is formed by the process of filling cup 12 with a confection mix 14 dispensed from a nozzle 16 in any conventional manner. Usually, in accordance with convention, a measured charge of confection is dispensed into the cup 12 and the uppermost configuration of the confection 14 is conical as illustrated in Figs. 7 and 8. The volume of confection 14 is sufficient that it will substantially fill the cup 12 when the conical configuration of the upper portion of the confection 14 is depressed into the cup 12.

Inasmuch as cup 12 is of a fragile, collapsible nature, the present invention also comprises a cap 18 which, in the preferred embodiment of the invention, is relatively rigid and formed from suitable chipboard, pasteboard or the like. Said cap has a diameter slightly less than the inner diameter of the upper portion of the cup 12, whereby said cap 18 may be pressed against the conical upper portion of the confection 14 shown in Figs. 7 and 8 and thus cause said confection to be depressed within the cup 12 and cause firm adherence of the cap to the confection 14 which, being of a sticky or tacky nature, will cause the cap 18 to be effectively, but removably, attached to the confection 14 notwithstanding the fact that the perimeter of the cap 18 is preferably out of contact with, or at least out of substantial frictional contact with, the inner surface of the cup 12. Usually, in accordance with the preferred embodiment of the invention, there will be a slight space 20 between the perimeter of the cap 18 and said inner space of the cup 12 as clearly shown in somewhat exaggerated form in Fig. 10 of the drawings. This arrangement effectively prevents any damage to the fragile and collapsible cup 12 while the cap 18 is being applied thereto. In most instances, said cap is inserted within the upper portion of the cup 12 as clearly shown in Figs. 9 and 10. It will be understood of course that the bottom of the cup 12 is firmly supported while the cap 18 is being applied in the manner described above.

A plurality of caps 18 may be applied simultaneously to a corresponding number of confection filled cups 12 by a gang or plurality of plungers or heads 22 which are preferably of the suction type as described in greater detail hereinafter, said heads 22 holding the caps 18 and also serving as plungers to depress them against the confection 14 in each cup 12 for the above described purposes.

In view of the fragile nature of the cup 12, it has been found that an effective means for holding a plurality of cups while being filled and capped comprises a box 24 which may be of inexpensive cardboard construction and of adequate size to hold a desired number of cups 12 in a predetermined pattern. A spacing sheet or plate 26, which may be formed from materials similar to that of the box 24, can be provided with a plurality of apertures 28 which respectively receive one of the cups 12. The bottoms of the cups 12 rest upon the bottom of the box 24 which serves as supporting means disposed substantially within the plane of table 32, whereby the cups 12 are effectively held in position to be filled with confection as well as to be capped after being filled with confection, this process being described in greater detail hereinafter in conjunction with the description of the capping machine. The box 24, after the caps 18 have been applied to the cups 12, may be covered, if desired, and the confections, frozen or otherwise, may be sold within said box, thus utilizing the ultimate package for a plurality of the confection filled cups as a means to facilitate the final production of the filled cups comprising the product of the present invention.

Figure 1:
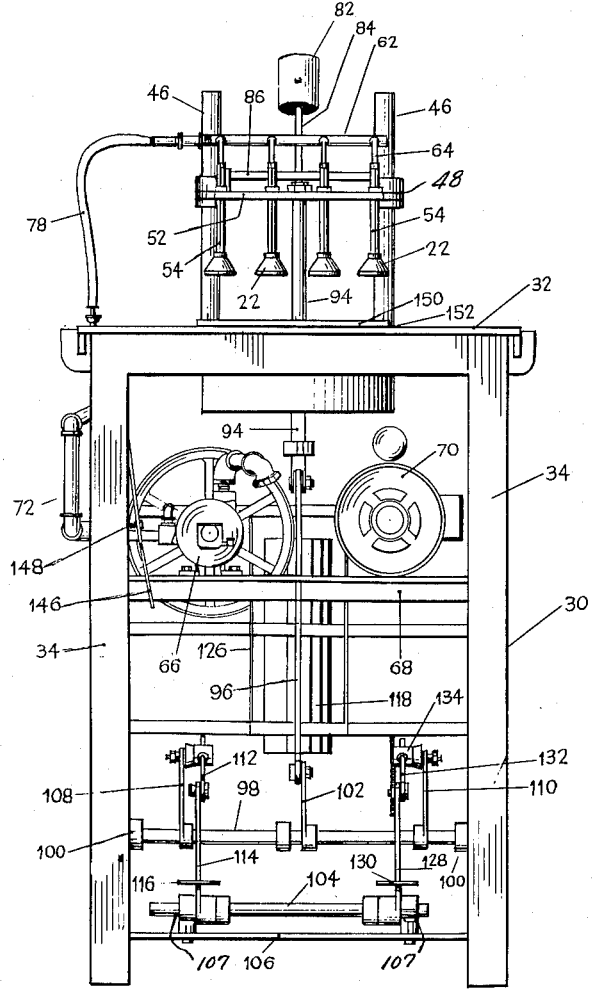
Fig. 1 is a front elevation of a capping apparatus embodying the principles of the present invention.

Figs. 1 through 3 respectively show front, side and rear vertical elevations of a cap applying apparatus or machine 30 also comprising part of the present invention. Said machine comprises a table 32 supported horizontally at approximately conventional table height, by a frame comprising a plurality of legs 34 connected by suitable cross members. Table 32, as shown in Fig. 4 is provided with a plurality of apertures 36 arranged in a predetermined pattern or configuration, the pattern illustrated herein comprising a dozen regularly arranged apertures. Depending from each aperture 36 is a well-like cylindrical reservoir 38, said reservoir having either a bottom or inturned flange 40 at its lower end. An inverted cup shaped member comprising a piston 42 supports a stack of caps 18 within each reservoir 38. Resilient means such as a coil spring 44 is positioned between the flange 40 and the underside of the piston 42 for purposes of resiliently supporting the stacks of caps 18 within each reservoir 38 and urging them upward.

Extending upward from the table 32 adjacent one side of the aperture 38 is a pair of post-like guide members 46 which slidably support a head assembly 48. The head assembly 48 is provided with a plurality of bearing bosses 50 which slidably receive the members 46. A frame or plate 52 is included within the head assembly 48 and extends laterally from the bearings 50 for purposes of supporting a plurality of tubular stems 54, each of said stems terminating in a suction head 22. Suction heads 22 not only serve to support caps 18 by suction against the underface of said heads but they also serve as plungers for purposes of compressing the caps 18 against the confection 14 and cause the caps to adhere to the confection while the confection is being compressed into the cups 12. It will be noted that the lower face of each head 22 comprises a face plate 58 having a suitable number of very small diameter holes 60 therein through which suction may be applied to cause the caps 18 to be held against the face plates 58 and the heads 22. The heads 22 may be threaded or otherwise secured in an airtight manner to the lower ends of the stems 54 as clearly shown in Fig. 5.

The stems 54 are arranged in a pattern relative to plate 52 to correspond to the pattern of the apertures 36 in table 32. The stems 54 are secured in any suitable manner to the plate 52 so as to be fixed relative thereto as well as to each other. The upper ends of the tube stems 54 are connected to a conduit 62, with tubes 64 extending laterally between conduit 62 and the upper ends of the stems 54. It will be noted that the head assembly 48 is reciprocable in opposite vertical directions relative to the guide members 46, it being understood that the heads 22 of the head assembly 48 are coaxial with the apertures 36 in table 32, whereby said heads 22 may be lowered into said apertures as well as the reservoirs 38 for purposes of having the uppermost cap 18 in each reservoir attached to each head 22 as described above.

Suction is furnished to the head assembly 48 by means embodied in the machine 30, said means comprising a vacuum pump 66 supported on suitable cross members 68 beneath the table 32. Said pump may be driven by an electric or other suitable type of motor 70 connected by a belt or otherwise to the pump 66. The suction end of the pump 66 is connected to suitable piping or tubing 72 supported by the frame of the machine 30 as clearly shown in Figs. 1 through 3. The piping 72 has a suction relieving valve 74 connected therein intermediate the ends thereof and a suction indicating gauge 76 is also preferably connected in the piping 72. A flexible tube 78 is connected between the terminal end 80 of piping 72 and one end of the conduit 62. When the pump is operating and valve 74 is closed, continuous suction will be applied to conduit 62 and the heads 22. Thus, when said heads are lowered into the reservoir 38, the uppermost cap 18 in each reservoir will be attached to the head by suction.

In order that the projecting head assembly 48 may not cause canting or cocking of the bearings 50 relative to guide members 46, a suitable counterweight 82 is adjustably supported on a stem 84 which projects laterally from plate 52 in an opposite direction from portion of the plate 52 projecting laterally from the bearings 50. The counterweight 82 can be adjusted on the stem 84 so as accurately to balance the weight of the head assembly 48. Further, a more accurate and controlled reciprocal movement of the head assembly 48 is afforded by a plurality of guide members 46 rather than merely providing, for example, a single guide post or member. Accordingly, to insure equal vertical movement of the bearings 50 relative to the respective guide members 46, the head assembly 48 is provided with a transverse shaft 86 which is journaled in bearing members 88 fixed to plate 52. A pinion gear 90 is fixed to each end of shaft 86, said gears respectively meshing with gear racks 92 formed on the guide members 46 as clearly shown in Figs. 2 and 3. By this arrangement, corresponding and equal movement of the bearings 50 will be assured relative to the guide members 46.

Thus far, a reciprocably mounted suction head assembly has been described as well as the means for applying suction to all heads 22 of the head assembly, and also means for guiding the head assembly relative to the table 32 and the cap reservoirs 38. It will be understood that under some circumstances, movement of the suction head 48 may automatically be effected and controlled, especially under circumstances where, for example, boxes 24 containing confection filled cups 12 are moved automatically beneath the elevated head assembly 48 when caps are to be applied to the cups in each box as moved beneath said head assembly. The suction applying means and guide means for the head assembly described herein are well suited for automatic operation. However, in the specific embodiment of the invention illustrated herein manually operated actuative mechanism is described and illustrated as follows:

Depending from plate 52 substantially between guide members 46 is a cross-head shaft 94 which extends through a suitable bearing in the table 32. A connecting rod 96 is pivotally connected at one end to the lower end of shaft 94. Oscillatable shaft 98 is mounted at its ends in suitable bearings 100 fixed to two of the legs 34 of the frame of the machine 30. Connected to shaft 98 between the ends thereof is a crank arm 102, the outer end of which is pivotally connected to the other end of connecting rod 98.

A treadle shaft 104 is mounted in spaced relation but parallel to shaft 98, the treadle shaft being supported by cross-members 106, bearings 107 being fixed to said cross-members and receiving the end portions of treadle shaft 104.

Fixed to shaft 98 is a pair of crank arms 108 and 110. The free end of the crank arm 108 is connected adjustably to one end of a connecting rod 112, the other end of said rod being pivotally connected to one arm of a bell crank treadle member 114, the latter having a foot treadle 116 fixed to the other arm of said member 114. From the foregoing, it will be seen that when the foot treadle 116 is depressed, the treadle member 114 will move the connecting rod 112 to cause oscillation of shaft 98 clockwise and thereby effect downward movement of connecting rod 96 and shaft 94 which, in turn, lowers the head assembly 48 relative to the guide members 46.

Upon releasing the foot treadle 116, restoration of the head assembly 48 to its elevated position, illustrated in Figs 1 through 3, is effected by counterweight mechanism comprising a weight 118 suspended from one end of a flexible member such as a chain 120 arranged around guide pulleys or gears 122 supported by the frame of the machine 30, the other end of the flexible member 120 being connected to a dog 124 fixed to the lower end of shaft 94. If desired, a suitable guard frame 126 may be arranged around the weight 118.

The foot treadle 116 and the mechanism actuated thereby for lowering the head assembly 48 relative to the cap reservoirs 38 may be operated not only to lower the heads 22 into the reservoirs for purposes of caps being attached thereto by suction, but, after said head assembly with the caps attached thereto has been restored to its elevated position and, for example, a box 24 containing confection filled cups 12 is placed beneath the head assembly for capping, the treadle 116 may then be depressed for purposes of applying the caps to the confection filled cups 12 so as to cause adherence of the caps to the confection and also to compress and level the upper portions of the confection masses within the cup 12.

It must be remembered, however, that the cups 12 are of a fragile and readily collapsible nature. Thus, additional means are provided for use, if desired, particularly to lower the head assembly 48 during the capping operation to insure that only rather precisely limited downward movement of the head assembly and caps may take place, said additional mechanism being as follows:

A second bell crank treadle member 128 having a foot treadle 130 on one end thereof is pivotally supported by shaft 104. The other end of treadle member 128 is pivotally connected to a connecting rod 132. The opposite end of the connecting rod 132 has a slidable connection with a bearing member 134 pivotally connected to the outer end of crank arm 110 which is fixed at its other end to shaft 98 as described above. The slidable end of connecting rod 132 has an adjustable stop nut 136 threaded thereon. Thus, when the foot treadle 116 is depressed, the treadle member 128 remains stationary since the slidability of connecting rod 132 relative to bearing member 134 on crank arm 110 permits lost motion between the crank arm 110 and connecting rod 132. However, when it is desired that the capping movement of the head assembly 48 will be stopped at a predetermined position so as to prevent injury of the fragile cup 12 by overtravel of the suction heads 22, the treadle member 128 is actuated by depressing foot treadle 130 thereof and thereby cause movement of the shaft 98 in clockwise direction as viewed in Fig. 2 for purposes of lowering the shaft 94 and head assembly 48.

This downward movement is limited in an adjustable manner by means of a finger 138 which projects outward from treadle member 128 as viewed in Fig. 2, it being understood in this view that treadle member 128 is positioned rearwardly of treadle member 114 and therefore hidden from view since the treadle members 114 and 128 are substantially duplicates of each other with the exception of treadle member 128 having finger 138 projecting therefrom. As the treadle member 128 moves clockwise as viewed in Fig. 2, the finger 138 will be moved similarly until said finger engages the head 140 of a stop screw 142 which is threaded into any suitable supporting means such as bearing 107. The threaded arrangement of the stop screw 142 permits adjustability of the pivotal movement of treadle member 128 and particularly of the stopping position of said treadle member. The return of the treadle member 128 to its starting position is insured by elastic spring 144 connected between said member and the frame of the apparatus.

After the caps 18 have been affixed to the confection filled cup 12 in the manner described above, the suction releasing valve 74 may then be opened by any appropriate mechanism such as a knee-operated lever 146. The lever 146 has an extremity portion preferably positioned conveniently so, for example, the knee of an operator may engage it when the foot treadle 130 has been depressed to cap the cups 12 as described above. The lever 146 will be held in valve opening position momentarily while the foot treadle 130 is permitted to raise and thereby cause counterweight 118 to elevate the head assembly 48 sufficiently to permit disengagement of the suction heads 22 with the caps 18 that have just been attached to the confection filled cups 12. The lever 146 is then released and suitable means such as a spring 148 will restore the lever 146 to the normal position thereof wherein valve 74 is closed.

To review the operation of the capping machine and summarize the same, the foot treadle 116 is depressed to effect the lowering of the head assembly 48 sufficiently to project the suction heads 22 into the cap reservoir 38. The springs 44 in each reservoir permit a substantial amount of floating movement whereby the lowering movements of the heads 22 into the reservoir need not be very precise, yet no injury will be sustained by the apparatus. Suction is meanwhile constantly being applied to the heads 22 by the suction pump 66.

Upon the heads 22 engaging the uppermost cap 18 in each reservoir the same is attached to each suction head, whereupon the foot treadle 116 is then released to permit it to raise and the counterweight 118 thereupon elevates the head assembly 48 with caps attached thereto to the position illustrated in Figs. 1 through 3. Where a multiple head unit such as head assembly 48 is used, suitable supporting means such as a box 24 is utilized to hold a plurality of uncapped but confection-filled, fragile cups 12 and is placed precisely beneath the elevated head assembly 48. The positioning of the box 24 below said head in a precise manner is facilitated by guide means comprising vertical rail 150 which is secured to the table 32 and at one end of said rail a short stop rail 152 is formed and is likewise secured to the table 32. It will be seen from Fig. 4 particularly that the guide rail 150 and stop rail 152 affords simple but highly effective means by which an operator may move a box 24 filled with cups 12 beneath the caping head in such a manner that the individual cups 12 respectively are positioned axially aligned with and beneath the heads 22 as well as said cups being coaxial with and directly over the cap reservoirs 38. Thus, the box 24 prevents movement of the cups into the reservoir 38.

After placement of the cups within the box 24 beneath the capping head as aforesaid, the foot treadle 130 may then be depressed to lower the head assembly 48 a predetermined, limited amount to cause the caps 18, which are attached by suction to said heads 22, simultaneously to engage and firmly adhere to the confection in each cup 12 and also compress and flatten the conical upper portions of the confection within the cups. Inasmuch as the diameters of the caps 18 are slightly less than the inner diameters of the upper portions of the cups 12, the perimeters of the caps 18 are slightly spaced from the walls of the cups 12 when applied thereto as aforesaid or at least said caps are not in any appreciable frictional engagement with said walls. Thus, injury of the cups by the caps during the capping operation is prevented and a sanitary confection is produced as a result of the effective capping of the confection filled cups by preferably relatively stiff caps 18.

Knee lever 146 may then be operated to release the suction within the heads 22 and foot treadle 130 may then be released to permit counterweight 118 to elevate the head assembly 48 to starting position, thereby freeing the box of cups 12 from engagement by the heads 22 so that the box 24 containing the capped sanitary confection products 10 may then be removed from engagement with the guide rails 150 and 152. The box of capped and completed sanitary confection products 10 may then be packaged further, if desired, by placing a telescoping or other suitable cover over the box 24. If the confection 14 within the cups 12 is of a semi-frozen dairy type such as ice cream or water ice, when capped the boxed and capped confections 10 are moved promptly from the capping machine 30 to a freezing room to complete the freezing of the confection within the cups 12 and said confections then are maintained in frozen condition until ready for consumption.

When the ultimate consumer obtains, for example, a frozen sanitary confection product 10 of of the type described above, he may either remove the cap by slightly forcing a part of the upper rim of the cup 12 away from the perimeter of the cap 18 so that when engaging a finger nail, for example, beneath said edge of the cap, he may remove it from the confection filled cup 12. However, the consumer may also hold the capped confection within his hand for a minute or so until the outer portion of the frozen confection is warmed enough to melt it slightly and permit squeezing of the lower portion of the cup 12. This will cause the upper portion of the confection to move upward from the top of the cup 12 and carry the cap 18 therewith. The cap may then readily be engaged to remove it from the top of the confection 14. The confection is then ready to be eaten and continued squeezing of the lower portion of the cup 12 will progressively force more confection above the rim of the cup 12 until the confection is entirely consumed.

It will thus be seen that the present invention provides a novel and sanitary type confection contained in an inexpensive, disposable and collapsible container and by squeezing the lower portion of the container so as to collapse it, the confection within the container may readily be eaten from the upper part thereof in a manner similar to which an ice cream cone is eaten. While being stored awaiting sale, however, the cap 18 maintains the confection contents of the cup 12 in safe and sanitary condition until ready to be consumed by the purchaser. The invention further comprises a method for affixing the caps 18 to the confection filled cups without relying upon frictional engagement between the caps 18 and the walls of the fragile cups 12, whereby said capping process does not result in injury to the cups. The adherence of the caps to the confection within the cups is highly adequate to insure the caps being retained in operative, covering position on the confection within the cups 12 and the entire confection is thus preserved in sanitary condition until consumed.

Still further, the capping machine illustrated herein is adapted especially to effect the application of the caps 18 to the confection filled cups 12 in a highly efficient manner and without injury to the cups, the machine being rugged and simple and thus relatively inexpensive in construction yet capable of easy operation with relatively few moving parts of the nature which sustain appreciable wear.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. Apparatus for affixing a closure cap to a cup and comprising in combination, a table having an opening therein, a well-like receptacle depending from said opening and arranged to contain a plurality of stacked caps therein, a guide post projecting upward from said table, a head mounted for movement on said post and movable into said receptacle from a position thereabove, suction creating means connected to said head, actuating means operable to move said head into said receptacle and remove therefrom by suction the uppermost cap therein to a cap applying position above said receptacle, and supporting means cooperable with said table to support a cup positioned substantially in the plane of said table beneath said head and over the top of said receptacle, said actuating means then being operable to move said cap into capping position on a cup when held by said supporting means to be capped.

2. The capping apparatus set forth in claim 1 further characterized by said head including a guide bearing receiving said post and said head also extending laterally from said post, said apparatus additionally including a counterweight projecting laterally from said head in opposition to said head extension thereby to minimize canting of said bearing relative to said post.

3. A capping apparatus for attaching closure caps to cups and comprising in combination, a table having a plurality of openings therein arranged in a predetermined pattern, a well-like receptacle depending from each opening and each receptacle being arranged to contain a plurality of stacked caps, guide means projecting upward from said table, a head assembly mounted for reciprocating movement on said guide means, said head assembly comprising a plurality of heads arranged in a pattern similar to said table openings and said heads being movable into said receptacles when said head assembly is moved in one direction, suction creating means connected to said heads, actuating means operable to move said head assembly toward said table and project said heads into said receptacles to remove therefrom by suction the uppermost cap in each receptacle to cap applying positions above said receptacles, and supporting means cooperable with said table to support a plurality of cups positioned substantially within said plane in corresponding pattern to said heads beneath the same and adjacent the tops of said receptacles, said actuating means then being operable to move said caps into capping position on each cup when held for capping by said supporting means.

4. A capping apparatus as set forth in claim 3 further characterized by said cup supporting means comprising boxlike means arranged to hold a plurality of cups arranged in a pattern similar to said table openings, said box and cups being positionable upon said table over said openings after said heads have been lowered into said receptacles to have caps attached thereto and then elevated above said table.

5. A capping apparatus as set forth in claim 3 including additional guide means associated with said table and operable to coengage said cup supporting means and accurately position the cups therein beneath said heads prior to said heads and the caps attached thereto being lowered to capping position.

6. A capping apparatus as set forth in claim 3 further characterized by said guide means comprising a pair of spaced posts slidably received by bearings in said head assembly, and additionally including a gear rack on each post and a pair of interconnected pinion gears respectively engaging said gear racks and pivotally supported by said head assembly, whereby canting of said head assembly relative to said guide posts is minimized.

7. A capping apparatus as set forth in claim 6 further characterized by said head assembly projecting laterally from said posts, and counterweight means carried by said head assembly and operative to counterbalance the offset effect of the lateral projection of said head assembly.

8. A capping apparatus as set forth in claim 3 including further a plurality of levers arranged to be operated selectively by an operator and interconnected to said head assembly, one of said levers being arranged when moved in one direction to move the heads of said assembly into said receptacle to have caps attached thereto, and another of said levers being arranged when moved in one direction to move said heads only a predetermined amount in capping direction toward said table.

9. A capping apparatus as set forth in claim 8 further including a valve in said means connecting said suction creating means to said heads, and valve operating means arranged conveniently to be actuated by an operator to relieve the suction to said heads at the conclusion of said capping movement of said heads.

References Cited in the file of this patent

UNITED STATES PATENTS

| | | |
|---|---|---|
| 1,641,743 | Dawson | Sept. 6, 1927 |
| 1,919,060 | Harder | July 18, 1933 |
| 2,143,806 | Stuart | Jan. 10, 1939 |
| 2,486,194 | Moser | Oct. 25, 1949 |
| 2,598,137 | Schulz et al. | May 27, 1952 |